E. H. SUTTON.

Cotton-Cultivator.

No. 7,955. Reissued Nov. 20, 1877.

Attest:
H. H. Schott.
J. Mason Boyler

Inventor:
Edward H. Sutton
By Newton Crawford
atty.

N. PETERS, PHOTO-LITHOGRAPHER, WASHINGTON, D. C.

UNITED STATES PATENT OFFICE.

EDWARD H. SUTTON, OF EDENTON, NORTH CAROLINA.

IMPROVEMENT IN COTTON-CULTIVATORS.

Specification forming part of Letters Patent No. 149,543, dated April 7, 1874; Reissue No. 7,955, dated November 20, 1877; application filed November 3, 1877.

*To all whom it may concern:*

Be it known that I, EDWARD H. SUTTON, of Edenton, in the county of Chowan, in the State of North Carolina, have invented certain Improvements in Cultivators and Plows, of which the following is a specification:

My invention relates to that class of agricultural implements known as "cotton-cultivators;" and it consists in the construction of the implement, as will be fully hereinafter described.

Figure 1:
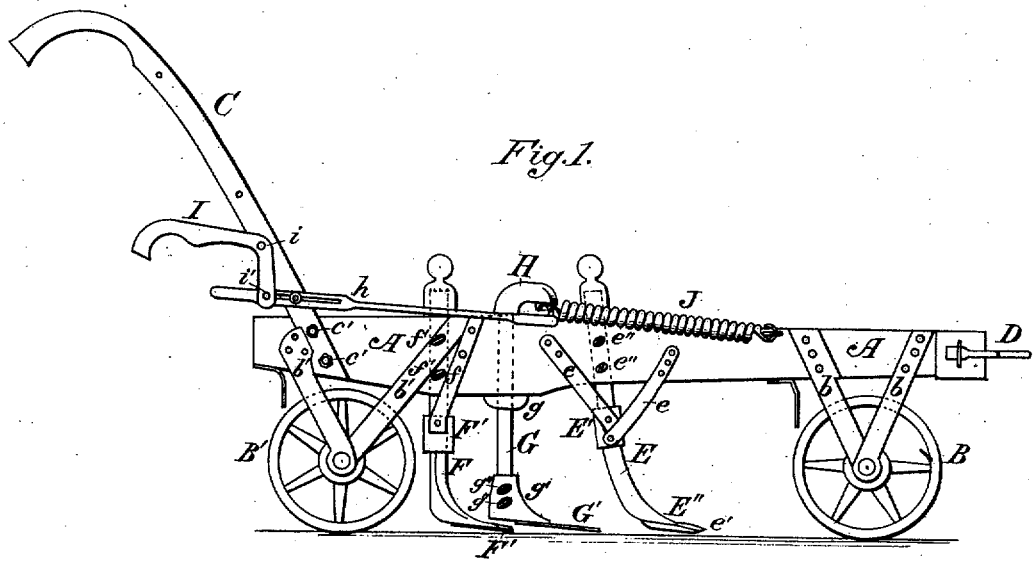
Figure 2:
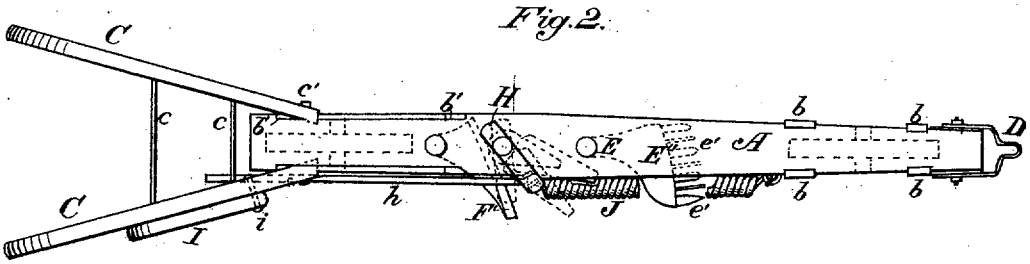

In the drawings, Figure 1 represents a side elevation of the implement, and Fig. 2 a top view of the same.

A represents the beam of the cultivator, which is mounted upon two wheels, one near the fore end, and the other near the rear or hind end. B and B′ are the two supporting-wheels—B the forward, and B′ the hind wheel—the axles of which have bearings in supporting-braces *b* and *b′*, that are securely bolted to the beam A, as shown in Fig. 1. C C are the usual handles to hold the cultivators in position, and are firmly bolted to the beam A by the bolts *c′*, and kept at their proper distance apart by the rounds *c*. D is the clevis at the fore end of the beam A, by which the cultivator is drawn forward. E is a standard passing upward through the beam A, and held in position by a sleeve, E′ and braces *e e*, with a cutter, E″, at its foot, having a series of cutting-points, *e′ e′*, thereon, and by which the ground is loosened. This standard is adjusted up or down in the socket and beam, to penetrate the ground deeper or shallower, as may be desired, and when so adjusted is secured in position by the clamping-screws *e″ e″* in the beam A.

F is the rear adjustable standard, carrying cutter F′ on its foot, wings outward or laterally, and has a smooth cutting-edge. This standard, like standard E, passes upward through a sleeve, F″, and held in position by braces *f*, and, when adjusted as to the depth it is to go in the ground, is secured in its place by the clamping-screws *f′* in beam A.

G is an oscillating standard passing through beam A and through a bearing, *g*, on the under side of the beam. Standard G is not adjusted up or down, but the cutter G′, at its lower end, is adjusted thereon to be higher or lower on the standard, through the socket *g′*, and held, when adjusted, by the screws *g″*.

H is a lever-arm upon the top of standard G, and above the beam A, projecting obliquely from the standard. Attached to the outer end of arm H is a slotted connecting-rod, *h*, running back to handle C, where the slot works on a pin that projects from the handle, and the rod can freely slide thereon.

I is a lever-handle, in bell-crank form, pivoted to the handle C at *i*, and to rod *h* at *i′*. J is a spring, firmly attached at its forward end to beam A, and at its rear end to the outer end of arm H, as seen in Fig. 1.

The cutter G′, on oscillating standard G, is thrown out by taking hold of lever-handle I and raising it, which causes a backward movement of rod *h*, and thereby turning the cutter G′ out to cut weeds or thin out the cotton-plants that grow beyond the reach of the cutters E″ or F′ on standards E and F, while the spring J will, when the lever I is released, cause the cutter G′ to return back to its original position.

It will be observed that the cultivator above described is not what is termed a "straddle-row" cultivator, but is a kind of bicycle-cultivator—that is, two wheels in line, one near the fore and the other near the hind end of the beam, so placed in order that the cultivator shall work parallel with the surface of the ground.

Having thus described my invention, what I claim is—

1. In a cotton-cultivator, the combination of the hand-lever I, slotted rod *h*, arm H, spring J, standard G, and cutter G′, as and for the purpose described.

2. The combination, in a cultivator, of the wheels B and B′, in the line of draft, with the adjustable cutters E″ and F′, as and for the purpose described.

3. The combination, in a cultivator, of the wheels B and B′, in the line of draft, with an oscillating standard, G, and swinging cutter G′, as and for the purposes described.

4. The combination, in a cultivator, of the wheels B and B′, in the line of draft, with the adjustable cutters E″ F′, and the swinging or oscillating cutter G′, as and for the purposes described.

EDWARD H. SUTTON.

Witnesses:

NEWTON CRAWFORD,
F. H. SCHOTT.